Aug. 29, 1944.  J. F. WALLACE  2,357,036
SHOCK ABSORBING STRUT
Filed Nov. 3, 1941
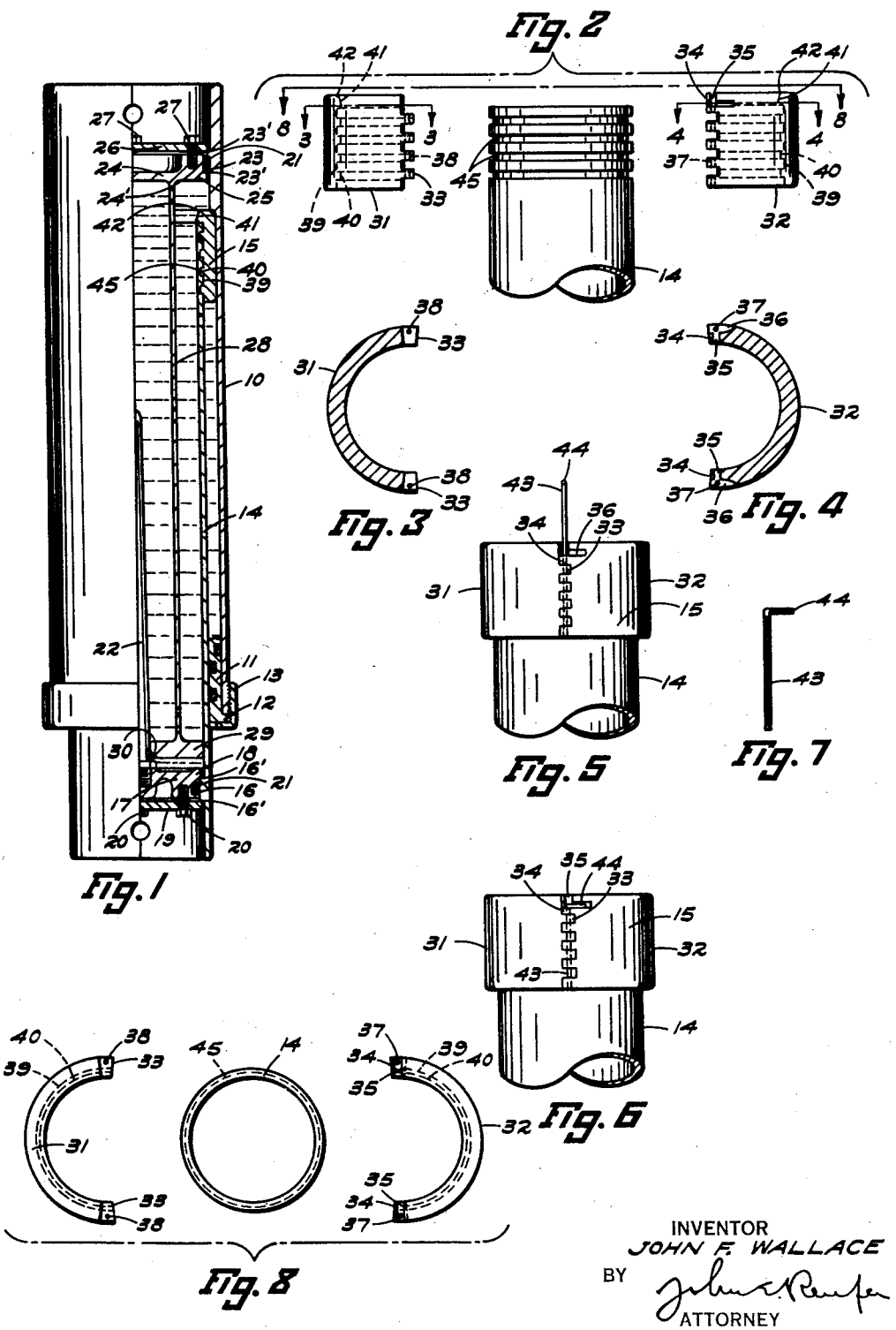
INVENTOR
JOHN F. WALLACE
BY
ATTORNEY Patented Aug. 29, 1944

2,357,036

UNITED STATES PATENT OFFICE 2,357,036

SHOCK ABSORBING STRUT

John F. Wallace, University Heights, Ohio, assignor to The Cleveland Pneumatic Tool Company, Cleveland, Ohio, a corporation of Ohio Application November 3, 1941, Serial No. 417,679

4 Claims. (Cl. 267—64)

This invention relates broadly to shock absorbing struts for airplane landing gears, but more particularly to improved connections between parts of such struts.

Shock absorbing struts for airplane landing gears generally include a pair of telescoping cylinders, the inner cylinder or piston tube being laterally spaced from the outer cylinder and carrying at its inner end a piston head slidably engaging the inner wall of the outer cylinder. Heretofore, the piston head was fastened to the inner end of the piston tube preferably by a screw threaded connection. In order to prevent unscrewing of the piston head from its carrying tube, it was necessary to either sweat the head on the tube or lock it thereon in such a manner which rendered the disassembly of these two members very difficult and expensive. Other parts of the strut were assembled in a similar manner, with the result that servicing of the strut or replacement of parts required the application of heat to the parts intended to be disassembled, an operation which often was found detrimental to the smooth finish of these parts, their hardness and accurate dimensions.

It is therefore one object of this invention to produce an improved detachable connection between cooperating parts of a shock absorbing strut enabling a rapid assembly and perfect union of the parts, which may readily be disassembled without the application of heat, use of specially designed tools and danger of injury to the parts.

Another object of this invention is to provide an improved connection between the piston head and its carrying tube of a shock absorbing strut, whereby relative rotation between these two members will not affect the connection or in any way tend to separate the piston head from the tube.

Another object of this invention is to provide a detachable connection between a piston head and tube wherein the axial thrusts normally tending to separate them is distributed throughout the length of the connection, thereby affording a union well capable of resisting axial shearing action to which it may be subjected.

Other objects and advantages more or less ancillary to the foregoing reside in the specific construction and aggroupment of the elements peculiar to this structure, as will become apparent from a more complete examination of this specification.

In the drawing:

Fig. 1 is a side elevational view partly in section of a shock absorbing strut assembly embodying the invention.

Fig. 2 is a side elevational view of the inner end of the piston tube and of the sectional piston shown in a disassembled condition.

Fig. 3 is a cross sectional view taken in a plane indicated by line 3—3 in Fig. 2.

Fig. 4 is a cross sectional view taken in a plane indicated by line 4—4 in Fig. 2.

Fig. 5 is a side elevational view of the piston and tube partly assembled.

Fig. 6 is a view similar to Fig. 5, showing the parts fully assembled.

Fig. 7 is a side elevational view of one of the locking members shown in Fig. 5.

Fig. 8 is a top plane view of the parts shown in Fig. 2.

Referring to the drawing, and more particularly to Fig. 1 thereof, 10 represents the outer cylinder of a shock absorbing strut which normally has its upper end fastened to the airplane in any suitable manner. The lower end of the cylinder 10 has mounted therein an annular bushing 11 having end flange 12 clamped between the inner end of the cylinder 10 and a retainer 13 screwed on the exterior of the cylinder.

Slidable through the bushing 11, there is an inner cylinder hereinafter referred to as piston tube 14 to the lower end of which is normally secured a landing wheel carrying mounting, not shown. To the inner end of the piston tube 14 there is a piston head 15 secured thereon in a manner hereinafter described.

Near its outer end, the piston tube 14 is provided with a relatively short reduced bore 16 forming on each end thereof an annular shoulder 16', within which bore is fitted a ring member 17 having an annular flange 18 resting against one shoulder 16' and clamped thereon by a plate 19 resting on the other shoulder 16' and secured to the member 17 by means of cap screws 20. In order to afford a fluid tight joint between the member 17 and the inner cylinder, the former carries an annular packing 21. Also carried by the member 17 there is a central metering pin 22 extending upwardly therefrom.

Near its upper end, the cylinder 10 is also provided with a relatively short reduced bore 23 forming on each end thereof an annular shoulder 23'. Within the bore 23 is fitted a disk member 24 having an annular flange 25 engaging one of the shoulders 23'. This member 24 is secured in position by a clamping plate 26 engaging the other shoulder 23' and pulled thereon by cap screws 27 extending into the member 24. A packing 24' also assures a fluid tight joint between the bore 23 and member 24. From the member 24 depends an integral central cylinder 28 which extends into the piston tube 14 and has its lower end formed with an orifice plate 29 slidably engaging with the inner wall of the piston tube 14 and provided with a central orifice 30 through which is free to slide the metering pin 22.

The connection between the piston tube 14 and piston head 15 includes a series of circular grooves 45 cut on the exterior of the inner end portion of the tube 14. These grooves are all of exactly the same width each having straight parallel side walls preferably perpendicular to the center axis of the piston tube. The piston 15 is preferably made of two semicircular sections 31 and 32, the vertical end walls of each section being provided with circularly extending teeth 33 equally spaced and capable of interlocking engagement with each other as shown in Fig. 5. One of the sections, in this instance, section 32, has its upper teeth 34 made somewhat wider than the other teeth and adapted to fit above the last upper teeth of section 31 in order that the two sections when coupled together will be perfectly flush relative to one another. These upper enlarged teeth 34 are each provided with a vertical substantially radially disposed slot 35 cut into the upper wall of section 32. In joining with each slot 35 the peripheral wall of section 32 adjacent the upper end thereof is provided with a small groove 36. Leading from the bottom of each slot 35 and extending through the groove 36 there is a vertical hole 37 extending through the teeth 34 and 33 of section 32, while the teeth 33 of section 31 are each provided with a similar hole 38 located in a manner calculated to match with the holes 37 when the two sections are mounted on the inner end of the tube 14, as shown in Fig. 5.

The inner wall of each section 31 and 32 is machine semicylindrical and provided with semicircular grooves 39 of a diameter substantially equal to the normal diameter of the piston tube 14. Between the grooves 39 are, of course, formed semiannular lands or splines 40 of a diameter substantially equal to the root diameter of the grooves 45 of the piston tube 14, the width of the spinle 40 being adapted to fit closely within the grooves 45. Toward its upper end, each section is formed with an internal annular flange 41 of a diameter substantially equal to the inner diameter of the piston tube 14, which flange 41 is flared outwardly as at 42 and forms, when each section is mounted on the piston tube, an outwardly flared continuation of the inner wall of the piston tube 14, as clearly shown in Fig. 1.

When assembling the piston head on its carrying tube, the two sections 31 and 32 are positioned thereon as shown in Fig. 5. Each of the two joints between the two sections is formed with the teeth 33 of one section meshing with the corresponding teeth of the other section to result in a substantially uninterrupted cylindrical surface or piston head on the cylinder tube. As previously stated when so assembled, each joint has the vertical holes of the teeth 33 of section 32 matching with the corresponding hole 38 of section 31. In order to prevent accidental separation of the two sections when the tube 14 is out of its component cylinder 10, there is introduced through the now continuous hole of each joint, which hole extends vertically through the teeth 33, a locking pin 43 which has its upper end bent at right angle from the body of the pin to form a head 44. The head of each pin will slide through one of the slots 35 provided in the enlarged teeth 34 of section 32 and comes to rest on the bottom of that slot which merged with the bottom of the groove 36 wherein the head 44 of the pin 43 may be rotated to fit within the groove 36 within the peripheral wall of section 32. Thus assembled, the two sections 31 and 32 are prevented from accidental removal from their carrying tube 14. When the tube 14 and piston head 15 are assembled within the cylinder 10, the pins 43 and more particularly their heads 44 are prevented by the inner wall of the cylinder 10 from rotating out of the grooves 36, thereby positively preventing removal of the pins 43 from the sections 31 and 32 when assembled within the cylinder 10.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a device of the class described, a cylinder, a tube and a piston head slidable in said cylinder, said piston head being made of two substantially semicircular sections jointed on said tube to form a substantially uninterrupted cylindrical head, the joints between said sections each including a plurality of interengaging teeth formed on the adjacent vertical end walls of said sections, a removable retaining pin extending vertically through the teeth of each joint, a head on said pin, a recess on the peripheral wall of each section adapted to receive the head of said pin, and interengaging means between said tube and sections preventing relative axial movement therebetween.

2. In a shock absorbing strut, a cylinder, a reduced bore within said cylinder forming on each end thereof an annular shoulder, means carried by said cylinder including a member axially fitted within said reduced bore, an annular flange on said member engaging one of said shoulders, a plate engaging the other of said shoulders, and fastening means between said member and plate adapted to securely hold said member within said reduced bore.

3. In a shock absorbing strut, a cylinder, a piston tube member slidable in said cylinder, a reduced bore within said tube member forming on each end thereof an annular shoulder, a member axially fitted within said reduced bore, an annular flange on said member engaging one of said shoulders, a plate engaging the other of said shoulders and carrying fastening means for securely holding said axially fitted member within said bore, a metering pin projecting inwardly from said axially fitted member, and means carried by the inner end of said cylinder having slidable engagement with said metering pin upon axial movement of said cylinder relative to said tube member.

4. In a shock absorbing strut, a cylinder, a piston tube member slidable in said cylinder, a reduced bore within said tube member adjacent the lower end thereof and forming on each end of said bore an annular shoulder, a member axially fitted within said reduced bore, an annular flange on said member engaging one of said shoulders, a plate engaging the other of said shoulders and carrying fastening means for securely holding said axially fitted member within said bore, a metering pin projecting inwardly from said axially fitted member, a disk member supported within said cylinder adjacent the upper end thereof, a second cylinder depending from said disk and movable within said tube member, and means on the lower end of said second cylinder having slidable engagement with said metering pin upon movement of said first cylinder relative to said tube member.

JOHN F. WALLACE.